United States Patent [19]
Amyot

[11] Patent Number: 5,186,478
[45] Date of Patent: Feb. 16, 1993

[54] TOOL CHUCK FOR A TURNING MACHINE SUCH AS A DRILL

[75] Inventor: Claude V. L. Amyot, Doubs, France

[73] Assignee: Etablissements Amyot S.A., Pontarlier, France

[21] Appl. No.: 625,363

[22] Filed: Dec. 11, 1990

[30] Foreign Application Priority Data

Dec. 11, 1989 [FR] France .................. 89 17200

[51] Int. Cl.$^5$ ............................................. B23B 31/12
[52] U.S. Cl. ....................................... 279/62; 279/147
[58] Field of Search ............................ 279/60–62, 279/1 K, 19, 19.4, 1 Q

[56] References Cited

U.S. PATENT DOCUMENTS

| | | | |
|---|---|---|---|
| 911,012 | 1/1909 | Jacobs | 279/62 |
| 1,369,412 | 2/1921 | Englund | 279/62 |
| 1,473,488 | 11/1923 | McConnell | 279/62 |
| 1,532,329 | 4/1925 | McConnell | 279/62 |
| 3,807,745 | 4/1974 | Bent | 279/60 |
| 4,272,087 | 6/1981 | Röhm | 279/62 |
| 4,274,642 | 6/1981 | Wunsch | 279/1 K |
| 4,842,288 | 6/1989 | Ando | 279/62 |

FOREIGN PATENT DOCUMENTS

| | | |
|---|---|---|
| 43785 | 1/1982 | European Pat. Off. . |
| 0300375 | 1/1989 | European Pat. Off. . |
| 1192908 | 5/1965 | Fed. Rep. of Germany . |
| 3600641 | 7/1987 | Fed. Rep. of Germany . |
| 2606691 | 5/1988 | France . |
| 959175 | 5/1964 | United Kingdom ............. 279/62 |
| 2206509 | 1/1989 | United Kingdom ............. 279/61 |

Primary Examiner—Larry I. Schwartz
Assistant Examiner—Robert Schultz
Attorney, Agent, or Firm—Oliff & Berridge

[57] ABSTRACT

A chuck includes a body mounted on the motor shaft of a machine. A plurality of jaws is mounted to slide in bores and converge forward. A sleeve surrounds the body and is mounted to pivot around the latter. The jaws have an outer threaded part which meshes with a nut surrounding the jaws and integral with the sleeve surrounding the body. A series of balls is interposed between the face of the nut which faces rearward and the body of the chuck. The balls abut a ring made of a hard material, and that ring in turn abuts a ring made of synthetic material which exhibits shock-absorbent characteristics and is locked against the body.

9 Claims, 1 Drawing Sheet

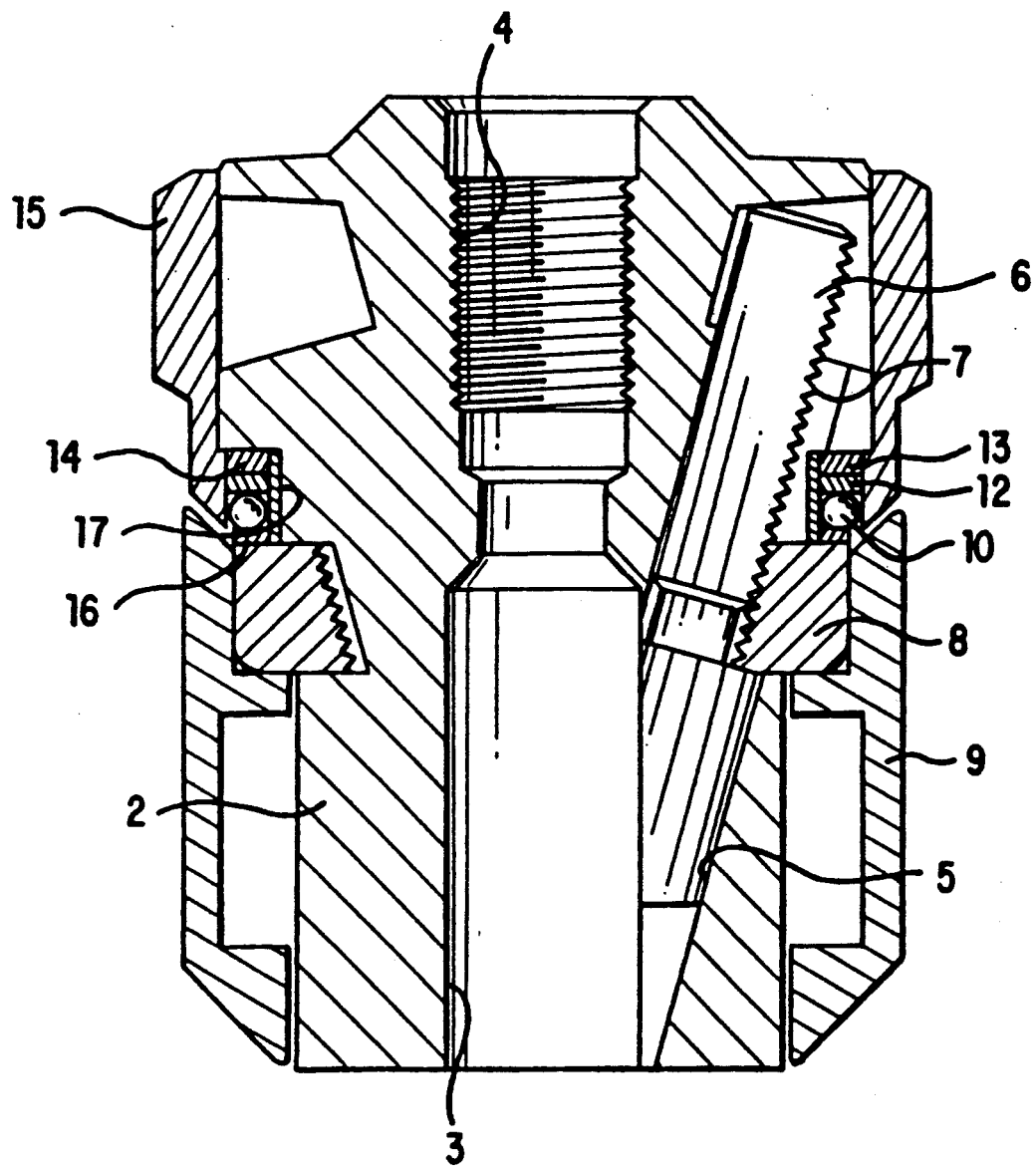

TOOL CHUCK FOR A TURNING MACHINE SUCH AS A DRILL

TECHNICAL FIELD

The present invention relates to a tool chuck for a turning machine such as a drill or a machine for screwing and unscrewing.

BACKGROUND

Chucks are used most often to secure a drilling or boring bit or a screwdriver bit on a motor shaft. A first option for locking the cylindrical shank of a tool in the chuck consists in equipping the chuck with a rack system which, with the aid of a key, locks the jaws on the tool before the machine is used. The rack causes rotation of a sleeve relative to the body, with a nut being mounted on the interior surface of said sleeve, the internal threads of said nut cooperating with the external threads on the jaws. While this solution is satisfactory from a practical standpoint, it has the disadvantage of requiring the use of a key which is frequently misplaced by the user. This use of a key is even more of a constraint in so-called cordless drills, in other words those powered by batteries which are an integral part of the body of the machine, and which lend it considerable mobility. These cordless machines or drills are generally provided with key chucks to hold the tools. This type of chuck permits use in both rotational directions and the passage of an axial screw to lock the chuck to the drill spindle when the rotational direction of the motor shaft tends to favor loosening of the chuck therefrom.

There are chucks which permit satisfactory locking of the tool without requiring the use of a key. A first known solution consists in providing, at the rear end of the sleeve which causes rotation of the nut that drives the jaws, a plurality of teeth. A ring mounted concentrically on the body is kept axially at a distance from the sleeve by the action of a spring and comprises at least one tooth opposite the sleeve. This ring is mounted to rotate freely around the body. In practice, to lock or unlock the tool, the user usually grasps the ring and moves it forward so that the teeth of the ring engage the teeth of the sleeve, at the same time that he sets the body of the chuck rotating, using the motor shaft, in one direction or the other. The result is a relative rotary motion of the matching teeth of the ring and sleeve, producing a series of impacts which promote the locking or unlocking of the jaws, depending on the rotational direction employed.

In another known chuck, the sleeve has at its forward end a part in the shape of a radial collar with a plurality of forward-facing notches. In addition, the screw that drives the jaws has press-fitted onto it a ring comprising forward-facing notches designed to mesh with the notches of the sleeve. A spring abutting the body of the chuck keeps the notches of the ring and sleeve in mesh until a certain force is reached. In practice, it is sufficient for the user who wants to lock or unlock the jaws to keep the sleeve from rotating by using his hand and to operate the motor shaft in one direction or the other. The result is a series of impacts produced by the notches of the ring against the notches of the sleeve, promoting locking or unlocking, as the case may be.

However, these two known chucks have a complicated structure which results in a high manufacturing cost and considerable inconvenience.

Another solution is provided in EP-A-0,300,375 which relates to a chuck using a very fine pitch for the jaws and a series of balls disposed between the nut and the body. The interposition of balls between the nut and the body is already known in industrial chucks. The chuck described in this document has the disadvantage of not having perfect self-unlocking characteristics and of being very awkward to operate for both locking and unlocking, in view of the fineness of the threads, and also of requiring a large outer diameter of the chuck in order to achieve a good locking action. Chucks comprising internal balls suffer from the disadvantage of not being able to be rotated to the left, of not permitting the passage of a central screw to lock the chuck to the spindle of the machine, and of loosening under the influence of powerful vibrations when operating with impacts.

SUMMARY OF THE INVENTION

A goal of the present invention is to overcome these disadvantages. To this end, the chuck comprises a body mounted on the motor shaft of the machine. A plurality of jaws is mounted to slide in bores and converge forward, and a sleeve surrounds and is mounted to pivot around the body. The jaws comprise an external threaded part engaging a nut surrounding the jaws and integral with the sleeve surrounding the body. A series of balls is interposed between the face of the nut facing rearward and the body of the chuck. The balls abut a ring, made of a hard material, and the ring itself abuts a ring made of synthetic material which exhibits shock-absorbing properties, and is locked against the body. The balls facilitate locking the chuck until a satisfactory locking action of the jaws on the tool is achieved, without any external assistance, while the ring made of synthetic material prevents any accidental loosening of the tool during drilling or impact operations.

BRIEF DESCRIPTION OF THE DRAWING

The invention will be understood from the description which follows, with reference to the attached schematic figure which shows a longitudinal section through a chuck of the invention.

DETAILED DESCRIPTION OF PREFERRED EMBODIMENTS

According to one embodiment of the invention, the ring which the balls abut is made of steel.

According to another embodiment, the ring interposed between the ring of hard material and the body is made of a 6-6-polyamide of the ZYTEL ST type.

According to one advantageous embodiment of the invention, the body comprises a peripheral recess serving to accommodate the series of balls, the ring made of hard material, and the ring made of synthetic material, respectively. The recess is open to the exterior and the several elements located therein are held therein by a sleeve surrounding the body and integral therewith. In addition to the simplicity of the design of this chuck, this solution, through knurling or grooving of this sleeve as well as the sleeve which is integral with the nut, improves the ease of handling of the chuck for the user.

In addition, this chuck may comprise a bushing oriented axially and arranged in contact with the balls, on the side of the balls which is located radially toward the interior of the body. This bushing prevents any danger of the balls entering the recesses for the jaws.

According to one advantageous embodiment of the invention, the pitch of the threads on the nut and the jaws is on the order of 1 to 1.50. This is a pitch which is not too fine; in other words, it does not require too large a number of turns to accomplish the locking and unlocking functions of a tool, but it is sufficiently fine to permit purely manual locking with ease.

According to another embodiment of this chuck, a ring made of a hard material, such as steel, is interposed between the balls and the nut. This part keeps the balls in place during the assembly operations and contributes to the proper functioning of the chuck because its surface has a better finish than that of the nut.

The chuck shown in the drawing comprises a body 2 having an axial bore 3. A thread 4 is provided at one end of the bore 3 to permit mounting on the threaded motor shaft of a machine, not shown in the drawing. As shown, axial bore 3 comprises a narrowed central part which allows engagement of a screw, not shown, designed to lock the chuck to the shaft of the machine, to prevent it from loosening when the motor shaft is driven in a direction which would result in automatic loosening of the chuck.

Inside the body are three bores 5 offset by 120° relative to one another, and inclined from the exterior to the interior and from the end of the chuck comprising threaded part 4 toward the other end of the chuck. Bores 5 terminate at this other end to permit possible displacement of jaws 6. Each jaw 6 has in its rear part an external threaded area 7 which engages a nut 8 which is itself surrounded externally by a sleeve 9 which is preferably shrunk onto said nut.

According to the invention, a stack of three types of elements is provided between nut 8 and body 2. First of all, there are steel balls 10 which rest on both nut 8 and a steel ring 12 parallel to the nut. Ring 12 in turn rests on a ring 13 made of synthetic material pressed against body 2. This ring 13 is advantageously made of a 6-6-polyamide, of the ZYTEL ST type. This material possesses outstanding shock-absorbing characteristics, while remaining sufficiently hard. Hardness is important to permit satisfactory locking of the tool during operation of the chuck. The series of three elements 10, 12 and 13 is accommodated inside a recess 14 provided in the body 2, open on the side of nut 8 and on the exterior of the body 2. To keep the elements in this recess 14, a sleeve 15 is mounted on body 2. Sleeve 15, like sleeve 9, has an external surface which facilitates its operation, for example fluting or grooving.

As shown in the drawing, a ring 16, preferably made of steel, is interposed between nut 8 and balls 10. In addition, a bushing 17 is interposed between balls 10 and body 2, on the side of the balls 10 that radially faces the interior of the body 2.

This chuck operates as follows:

To lock a tool such as a drill bit, the user uses one hand to immobilize sleeve 15 while he uses the other hand to rotate sleeve 9 which is integral with nut 8. When jaws 6 are in contact with the tool, the chuck is locked by the force applied by the user to turn sleeve 9. To unlock the chuck and release the tool, the user rotates sleeve 9 in the opposite direction.

As will be evident from the above, the invention represents a considerable improvement over the prior art, by providing a chuck of a simple design which possesses outstanding locking qualities without requiring the use of a key and which does not loosen during use.

Of course, the invention is not limited to the single embodiment of this chuck described above as an example; on the contrary, it includes all variations thereon. In particular, the nature of the materials comprising rings 12 and 13 could be different, or the structure of recess 14 receiving elements 10, 12 and 13 could be different, without departing from the scope of the invention.

What is claimed is:

1. A tool chuck for a machine with a rotating motor shaft, comprising:
    a body mountable on a motor shaft of a machine at a first end of said body and containing a plurality of bores which converge towards a second end of said body;
    a plurality of jaws slidably mounted on said bores and comprising external threads;
    a first sleeve surrounded and rotatable around said body, said first sleeve comprising a nut in threaded engagement with said external threads of said jaws, said nut having a nut face which faces said first end of said body;
    a series of balls interposed between said nut face and said body;
    a first ring made of a hard material interposed between said balls and said body; and
    a second ring made of a material which exhibits shock-absorbent characteristics interposed between said first ring and said body, said second ring being locked against said body, the hard material of said first ring being substantially harder than the shock-absorbent material of said second ring, and the shock-absorbent material of said second ring being substantially more shock-absorbent than the material of said body and said hard material of said first ring.

2. A chuck according to claim 1, wherein said first ring is made of steel.

3. A chuck according to claim 1, wherein said second ring is made of a synthetic material.

4. A chuck according to claim 1, wherein said second ring is made of a 6-6-polyamide.

5. A chuck according to claim 1, wherein said body comprises a peripheral recess which accommodates said series of balls, said first ring and said second ring, said recess being open to the exterior; and said series of balls, said first ring and said second ring are held in place by a second sleeve surrounding and integral with said body.

6. A chuck according to claim 1, wherein a pitch of the threads on said jaws and corresponding threads on said nut is about 1 to about 1.50.

7. A chuck according to claim 1, further comprising a third ring made of a hard material interposed between said balls and said nut face.

8. A chuck according to claim 7, wherein said third ring is made of steel.

9. A chuck according to claim 1, further comprising a bushing oriented axially with respect to said body and arranged in contact with said balls on a side of said balls which is located radially toward an axis of the body.

* * * * *